Jan. 21, 1941.  R. A. SANDBERG  2,229,525
AUTOMOBILE LOCK
Filed May 9, 1940
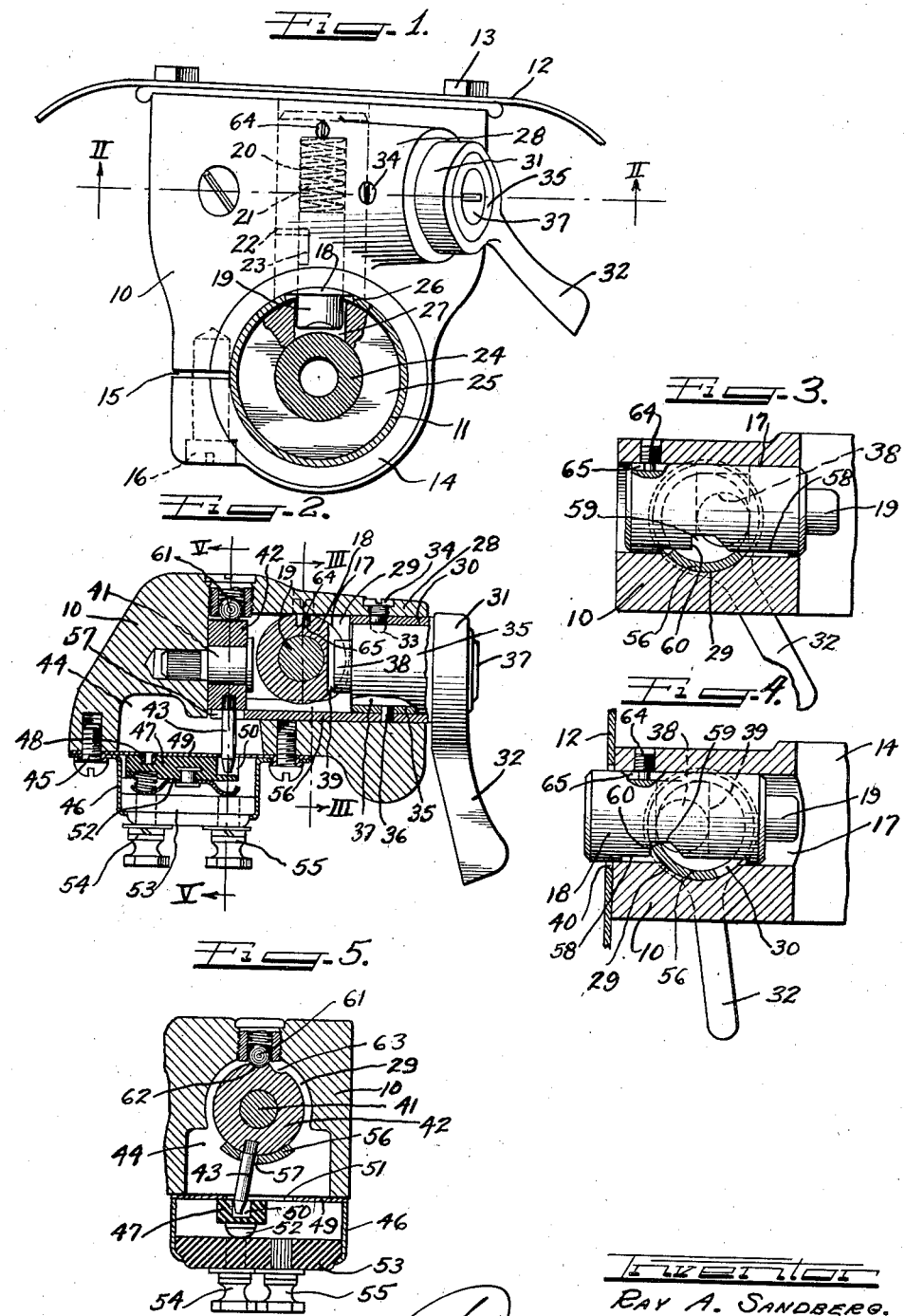
Inventor
RAY A. SANDBERG.

Patented Jan. 21, 1941

2,229,525

UNITED STATES PATENT OFFICE 2,229,525

AUTOMOBILE LOCK

Ray A. Sandberg, Waukegan, Ill., assignor to Houdaille-Hershey Corporation, Detroit, Mich., a corporation of Michigan Application May 9, 1940, Serial No. 334,110

8 Claims. (Cl. 70—252)

My invention relates to automobile locks, particularly to locks for locking automobile controls such as the steering and the ignition.

The important object of the invention is to provide a compact lock structure body readily secured to the automobile steering column and the instrument board, and more compact arrangement within the lock body of the axially shiftable steering locking controlling bolt and the switch operating structure, and with improved interlock between the locking bolt and the switch operating structure which will prevent operation of the switch operating structure for circuit opening movement when the lock bolt is in steering locking position and which will prevent shift of the lock bolt into steering locking position from its unlocking position until the switch operating structure has been operated to open the control circuit.

The various features of my invention are incorporated in the structure shown on the drawing, in which drawing:

Figure 1 is a plan view of the lock structure and with the steering column and shaft shown in cross section;

Figure 2 is a section on plane II—II Figure 1;

Figure 3 is a section on plane III—III Figure 2 showing the locking bolt in locking position;

Figure 4 is a view similar to Figure 3 but showing the locking bolt in unlocking position; and Figure 5 is a section on plane V—V Figure 2.

The lock structure body 10 extends between the automobile steering column 11 and the instrument panel 12 and is secured at its rear end to the panel as by means of bolts 13. The body has the annular cylindrical portion 14 receiving the column 11 and is split as indicated at 15 and receives a securing member such as a bolt 16 for contracting the portion 14 intimately against the steering column.

The body 10 has a longitudinally extending cylindrical bore 17 therethrough whose axis extends through the axis of the steering column 11, and in this bore is shiftable the body 18 of the steering locking bolt structure. As shown on Figure 1, the locking plunger 19 extends into the bore 20 in the body 18, a spring 21 in the bore urging the plunger outwardly, and a key 22 engaging in a channel 23 in the plunger limiting the outward movement thereof.

Extending through the steering column 11 is the steering shaft 24 on which is secured a collar 25. The column has the passageway 26 for the end of the locking plunger 19 and the collar has the opening 27 for receiving the plunger end so that, when the plunger is in its outer position, the steering shaft will be locked against steering movement.

The body 10 has the boss 28 extending laterally therefrom toward the right and this boss has the bore 29 extending therethrough and into the body 10 and intersecting the bore 17. Extending and fitting into the outer end of this bore 29 is a sleeve 30 having at its outer end the head 31 from which extends a lever arm 32. The sleeve has a circumferentially elongated slot 33 receiving the end of a stop pin 34 for limiting the rotational movement of the sleeve within the bore 29.

Extending through the sleeve 30 is the lock casing 35 which is held therein against rotational or axial movement by a key 36, and within the lock casing is rotatable the lock tumbler barrel 37 having a keyway for rotation thereof upon insertion of a proper key. Secured eccentrically to the inner end of the tumbler barrel is the cylindrical extension 38 for engaging in the transverse slot 39 provided in the side of the steering locking bolt body 18, so that upon turning of the tumbler barrel by the key the lock bolt structure may be shifted axially into its locking position shown on Figures 1 and 3, or to its unlocking position shown on Figure 4. As shown on Figure 4, the panel 12 to which the lock body is secured is provided with a passageway 40 through which the lock bolt may pass when it is shifted to its unlocking position.

Secured to the body 10 to extend axially a distance into the inner end of the bore 29 is a pin 41 on which a hub 42 is rotatable and from which hub a pin 43 extends downwardly through a recess 44 in the bottom of the body 10. Secured across the lower end of this recess, as by screws 45, is a housing 46 containing switch parts. As shown, the switch parts include a switch block 47 pivoted at its left end on a projection 48 struck up from the bottom 49 of the housing, this switch block at its right end having the slot 50 into which the pin 43 extends, the bottom 49 having a slot 51 for the pin. On its outer side the switch block mounts a switch blade 52. A plate 53 of insulating material is held in the outer end of the housing 46 and through this plate extends a circuit terminal 54 whose inner end is always engaged by the switch blade end which is in alignment with the pivot 48. This terminal 54 may be connected with a source of current, such as a battery. The right end of the switch blade is adapted for engagement with another terminal 55 which may connect with the ignition coil.

The cylindrical sleeve 30 which mounts the lock tumbler casing has a comparatively narrow portion at the lower side thereof extended to form a transversely arcuate arm 56 continuing along the bottom of the bore 29 and at its end having a slot 57 receiving the pin 43 so that when the lever arm 32 is swung for rotation of the sleeve 30, the hub 42 will be rotated and the pin 43 swung for movement of the switch block to circuit opening or circuit closing position. Thus, by operation of the key, the lock bolt structure may be shifted for locking or unlocking the steering, and upon swing of the lever 32 the switch is operated.

Figures 2, 3 and 4 show interlocking arrangement between the lock bolt structure and the switch actuating extension or arm 56. The lock bolt structure body 18, on its underside is cut away to leave a comparatively shallow longitudinally extending channel 58 terminating short of its ends, and intermediate of this channel the body 18 has a cross slot 59. As shown on Figures 2 and 3, when the lock bolt structure is in its locking position, the switch operating extension or arm 56 spans the slot 39 and the longitudinal edges of the arm 56 engage with the bottom of the channel 58 on opposite sides of the slot, and in this relative position the switch is in position to hold the circuit open, and the lever 32 will be locked against rotation and the switch cannot be closed.

However, when the lock bolt structure is shifted to unlocking position as shown on Figure 4, the slot 59 will be in registration with the corresponding edge of the switch operating arm 56 and the lever 32 can be swung for rotation of the sleeve 30 and the arm 56 for operation of the switch to close the circuit. It will also be noted that when the switch is closed, the edge of the switch operating arm 56 will be in front of the outer side wall 60 of the slot 59 so that the lock bolt structure will be held against shift thereof to its locking position, and that the lever 32 must first be swung back to the switch open position shown on Figure 3 before the lock bolt is released for movement back to its steering locking position. To yieldably hold the switch in either its open or its closed position, a spring-pressed ball 61 may be provided for engaging in notches 62 and 63 in the hub 42 which notches correspond with the open and closed positions respectively of the switch.

Figure 5 shows the switch in open position, and when the lever 32 is swung, the switch block will be swung for engagement of the end of the switch blade with the terminal 55 connected with an electrical circuit such as the ignition circuit, and such circuit will receive current from the battery connected with the terminal 54.

The locking bolt structure is held against rotational movement as by means of a key 64 engaging in the longitudinally extending channel 65 in the lock bolt body 18.

I thus produce a compact, simple and easily manufactured and assembled lock structure for locking automobile controls such as the steering and the ignition circuit. I do not, however, desire to be limited to the exact construction, arrangement and operation shown and described as changes and modifications may be made without departing from the scope of the invention.

I claim as follows:

1. A lock structure of the type described comprising a body having a bore extending thereinto from one side thereof, an electrical switch structure mounted on said body, a switch actuating structure rotatably mounted on said body at the inner end of said bore and connected with said switch structure, and a sleeve rotatable in the outer end of said bore and having a portion thereof extended toward said switch actuating structure and connected therewith whereby rotation of said sleeve will effect rotation of said switch actuating structure and operation of the switch structure.

2. A lock structure of the class described comprising a body having a first bore extending therein from one side thereof, a switch mounted on said body, a switch actuating structure rotatably pivoted at the inner end of said bore and having connection with said switch, a sleeve rotatable in the outer end of said bore and a connection between said sleeve and said switch actuating structure whereby when said sleeve is turned said actuating structure will be turned for operation of the switch, a second bore in said body intersecting said first bore, a lock bolt shiftable in said second bore between said sleeve and said switch actuating structure, key operable means in said sleeve for controlling the shift of said locking bolt to locking or unlocking position, and means controlled by the relative positions of said connection and bolt for locking said switch against operation when said bolt is in locking position.

3. A lock of the type described comprising a body having a first bore extending therein from one side thereof, a sleeve rotatable in the outer end of said bore and having a portion thereof extending to the inner end of said bore, a switch mounted on said body, means connecting the inner end of said extension with said switch whereby rotation of said sleeve will effect switch operation, a second bore in said body intersecting said first bore between the inner end of said first bore and said sleeve, a locking bolt shiftable in said second bore to locking or unlocking position, means within said sleeve key operable to control the shifting of said bolt, and means controlled by the relative positions of said extension and bolt for preventing operation of said switch when said bolt is in locking position.

4. A lock structure of the type described comprising a body, a rotatable sleeve and a rotatable switch actuating structure axially aligned in said body, a switch on said body, a locking bolt shiftable in said body between said sleeve and switch actuating structure, means within said sleeve operable to shift said bolt to locking or unlocking position, and a connection between said sleeve and switch actuating structure whereby rotation of said sleeve will effect rotation of said structure and operation of said switch.

5. A lock structure of the type described comprising a body, a rotatable sleeve and a rotatable switch actuating structure axially aligned in said body, a switch on said body, a locking bolt shiftable in said body between said sleeve and switch actuating structure, means within said sleeve operable to shift said bolt to locking or unlocking position, a connection between said sleeve and switch actuating structure whereby rotation of said sleeve will effect rotation of said structure and operation of said switch, and means for interlocking said bolt and said connection to prevent operation of said switch when said bolt is in locking position and to prevent shift of said bolt from unlocking to locking position while said switch is in a certain position.

6. A lock of the type described comprising a body, a sleeve and a switch actuating structure axially aligned in said body for rotational movement, a switch on said body operable by said switch actuating structure, a locking bolt axially shiftable in said body between said sleeve and switch actuating structure and in a direction transversely of the axis of said sleeve and switch actuating structure, a key rotatable lock barrel in said sleeve cooperable with said bolt to effect shift of said bolt to locking or unlocking position, a connecting member between said sleeve and switch actuating structure for transmitting the rotational movement of said sleeve to said structure for operation of said switch, and abutments on said bolt cooperable with said connecting member whereby said sleeve will be locked against rotational movement to effect closing of said switch when said bolt is in its locking position and whereby said bolt will be locked against movement from unlocking to locking position unless said sleeve is rotated to effect switch opening.

7. A lock of the type described comprising a body having a first bore extending therein from one side thereof, a switch mounted on the body adjacent the inner end of said bore, a hub rotatably mounted in the inner end of said bore and having an actuating arm extending therefrom into connection with said switch, a sleeve rotatable in the outer end of said bore, a connecting member extending from said sleeve along one side of said bore and connected with said hub whereby rotation of said sleeve will rotate said hub for switch actuation, said body having a second bore intersecting said first bore between said sleeve and said hub, a locking bolt shiftable axially in said second bore across said connecting member, a key operable lock in said sleeve having connection with said bolt for shifting of said bolt to locking or unlocking position, said bolt when in its locking position engaging said connecting member to prevent rotation of said sleeve or switch closure, and means whereby when said bolt is in unlocking position said sleeve may be rotated for switch closure and said bolt will be locked against return to locking position until said sleeve is rotated for switch opening.

8. A lock of the type described comprising a body having a first bore extending therein from one side thereof, a hub rotatably mounted at the inner end of said bore and having an actuating arm, a switch on said body operable by said arm, a cylindrical sleeve rotatable in the outer end of said bore and axially aligned with said hub and having a comparatively narrow portion extending therefrom to form a connecting arm therebetween and said hub whereby rotation of said sleeve will rotate said hub for switch operation, a second bore in said body intersecting said first bore between said sleeve and said hub, a locking bolt shiftable in said second bore, key operable means in said sleeve for shifting said bolt to locking or unlocking position, said bolt when in its locking position engaging the edges of said connecting arm to thereby lock said sleeve against rotation for switch operation, said bolt having a cross slot positioned in registration with one edge of said connecting arm when said bolt is in unlocking position whereby said sleeve may then be rotated for switch operation and whereby said bolt will be locked against return to locking position until said sleeve has been rotated to release said connecting arm from said slot.

RAY A. SANDBERG.